United States Patent [19]

Tsuji

[11] Patent Number: 5,590,571
[45] Date of Patent: Jan. 7, 1997

[54] STRUCTURE FOR MOUNTING AN OUTPUT GEAR AND BEARING TO A TRANSMISSION

[75] Inventor: Takeshi Tsuji, Tokyo, Japan

[73] Assignee: Mitsubishi Jidosha Kogyo Kabushiki Kaisha, Tokyo, Japan

[21] Appl. No.: 362,134

[22] Filed: Dec. 22, 1994

[30] Foreign Application Priority Data

Dec. 22, 1993 [JP] Japan .................................. 5-324657

[51] Int. Cl.⁶ ............................ F16H 57/02; F16C 35/077
[52] U.S. Cl. ......................... 74/606 R; 475/346; 384/585
[58] Field of Search .......................... 74/606 R; 475/346; 384/585, 542

[56] References Cited

U.S. PATENT DOCUMENTS 3,819,243  6/1974  Asberg et al. ........................... 384/542

FOREIGN PATENT DOCUMENTS 1-98736  4/1989  Japan .
4203659  7/1992  Japan .................................. 74/606 R
712692  7/1954  United Kingdom .................. 384/542

Primary Examiner—Rodney H. Bonick
Assistant Examiner—Mary Ann Battista
Attorney, Agent, or Firm—Birch, Stewart, Kolasch & Birch, LLP.

[57] ABSTRACT

In a transmission having a planetary gear unit arranged on one side thereof with respect to a partition wall integral with a casing, an output gear-and-bearing mounting structure is provided in which an output gear arranged on the other side of the partition wall opposite to the planetary gear unit is supported by the partition wall via a bearing. The output gear has a boss rotatably supported by the partition wall through the bearing fitted into an axial hole of the partition wall, and a flange located on the other side of the partition wall and extending along the same. An outer race of the bearing is fixed to a side surface of the partition wall facing the flange of the output gear, by a bolt inserted through a through hole formed in the flange of the output gear.

3 Claims, 3 Drawing Sheets

STRUCTURE FOR MOUNTING AN OUTPUT GEAR AND BEARING TO A TRANSMISSION

BACKGROUND OF THE INVENTION

1. Field of the Invention

The present invention relates to a transmission, and more particularly, to a structure for mounting an output gear and a bearing to a hydraulic automatic transmission of a motor vehicle.

2. Description of the Related Art

A hydraulic automatic transmission for a motor vehicle is generally equipped with a transmission mechanism which comprises a planetary gear unit including rotating elements for transmitting engine torque, such as sun gears and planetary carriers, and hydraulic frictional engaging elements such as hydraulic wet multi-disc clutches and band brakes. In this type of hydraulic automatic transmission, supply and discharge of operating oil to and from the hydraulic frictional engaging elements are controlled to change the operating conditions of the individual rotating elements in the planetary gear unit between rotating condition and fixed condition, so that the path of transmission of the engine torque within the planetary gear unit may be changed to achieve a desired speed (transmission gear ratio). The output torque of the planetary gear unit is transmitted to driving wheels of the vehicle through an output gear coupled to the planetary gear unit, a transfer gear meshed with the output gear, and a differential coupled to the transfer gear.

Hydraulic automatic transmissions include a type wherein the output gear is located substantially in the middle of the transmission. In this type of automatic transmission, the output gear is rotatably supported via a bearing by a partition wall formed integrally with a transmission casing and is located on one side of the partition wall opposite to the planetary gear unit in the axial direction of the transmission, as disclosed in Unexamined Japanese Patent Publication (KOKAI) No. 1-98736, for example. The bearing has an outer race spline-fitted into an axial hole of the partition wall and is inseparably fixed to the partition wall by a snap ring. However, this output gear-and-bearing mounting structure in which the output gear is mounted to the partition wall of the transmission casing through the bearing fixed to the partition wall by spline-fitting and the snap ring is disadvantageous in that it is poor in strength because large torque is transmitted through the output gear.

Therefore, it can be considered to employ an output gear-and-bearing mounting structure in which the outer race of the bearing is fastened to the partition wall by bolts to thereby increase the strength. In this mounting structure, the bearing is bolted to the partition wall from the side of the partition wall opposite to the output gear in the axial direction of the transmission so that the bolts may not interfere with the output gear. This means that the bolts are located on the same side of the partition wall as the planetary gear unit with respect to the axial direction of the transmission. Thus, when using this output gear-and-bearing mounting structure for a hydraulic automatic transmission having a construction such that an actuator for supplying and discharging operating oil to and from a hydraulic frictional engaging element of the planetary gear unit has a cylinder thereof formed by part of the partition wall, the cylinder must inevitably be located more outward than the bolts in the diametrical direction of the transmission.

This arrangement results in increased diameter of the transmission, making it difficult to provide a compact transmission. Further, this output gear-and-bearing mounting structure does not permit the output gear and the bearing to be assembled into a unit beforehand, thus lowering the efficiency in assembling the output gear and its peripheral parts.

SUMMARY OF THE INVENTION

An object of the present invention is to provide a structure for mounting an output gear and a bearing to a transmission, which structure is small in diameter and thus compact, permits the output gear and the bearing to be mounted with high strength, and which improves the efficiency in assembling the output gear, the bearing, and peripheral parts thereof.

According to the present invention, there is provided a mounting structure for mounting an output gear and a bearing to a transmission including a casing containing a planetary gear unit having a plurality of rotating elements and coupled to an input shaft, the output gear being rotatably supported by the bearing fitted in an axial hole which is formed in a partition wall extending inward from the casing and which extends along a longitudinal axis of the transmission. In this mounting structure, the partition wall has a side surface in which a threaded hole extending along the longitudinal axis of the transmission is formed. The bearing has a hole formed therein in alignment with the threaded hole. The output gear has a boss fitted into the bearing and coupled to a corresponding one of the rotating elements of the planetary gear unit, and a flange extending from the boss along the side surface of the partition wall. The flange has a through hole formed therein for alignment with the threaded hole of the partition wall and the hole of the bearing. The mounting structure includes a bolt for fixing the bearing to the side surface of the partition wall. The bolt is inserted through the through hole of the flange and the hole of the bearing and screwed into the threaded hole of the partition wall.

The present invention is advantageous in that the output gear and the bearing can be supported with sufficient strength because the bearing is bolted to the partition wall, and that the transmission casing can be reduced in diameter because the bearing is bolted on the same side as the output gear, thus making it possible to provide a compact transmission.

Preferably, the output gear-and-bearing mounting structure according to the present invention is installed in a transmission including a hydraulic friction element which engages or disengages in response to supply or discharge of operating oil by means of an actuator. A side surface of the partition wall opposite to the aforementioned side surface defines at least part of a cylinder of the actuator. The cylinder is located on an outer side of the bearing with respect to the bolt in a diametrical direction of the transmission. According to this preferred embodiment, the inner periphery of the cylinder can be located close to the bolt, making it possible to provide a compact hydraulic transmission.

Still preferably, the bolt has a head on which a head portion of a bolt-tightening tool is fitted, and the through hole of the flange has a diameter greater than that of the head portion of the bolt-tightening tool. This preferred embodiment ensures space large enough for the assembling work using the tool, and improves the efficiency in assembling the transmission, particularly the output gear, the bearing, and peripheral parts thereof.

DETAILED DESCRIPTION OF THE INVENTION

A hydraulic automatic transmission, to which the output gear-and-bearing mounting structure outlined above is applied, will be first explained with reference to FIG. 1.

Figure 1:
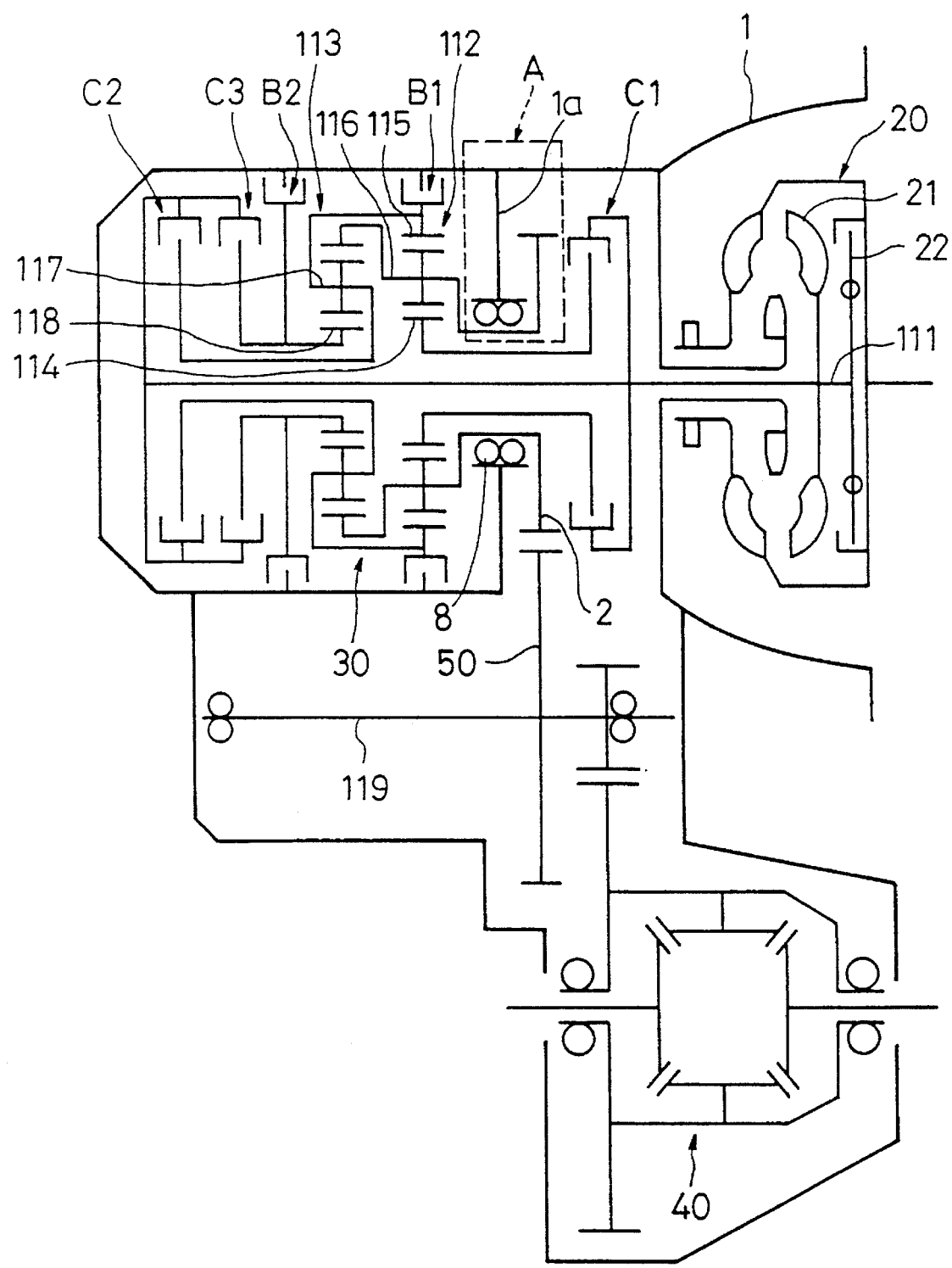
FIG. 1 is a skeleton diagram showing an example of a hydraulic automatic transmission for a motor vehicle.

The automatic transmission shown in FIG. 1 is installed in a motor vehicle, particularly an FF (front-engine, front-wheel drive) vehicle, and a casing 1 thereof contains a torque converter 20, a planetary gear unit 30, hydraulic frictional engaging elements (brakes B1, B2 and clutches C1, C2, C3), a differential 40, a transfer gear 50, etc. The planetary gear unit 30 includes a plurality of rotating elements, among which an output rotating element 116 is coupled to an output gear 2. As indicated at A in FIG. 1, the output gear 2 is located substantially in the middle along the longitudinal direction of the transmission. In FIG. 1, reference numerals 1a and 8 represent a partition wall and a bearing, respectively.

Figure 2:
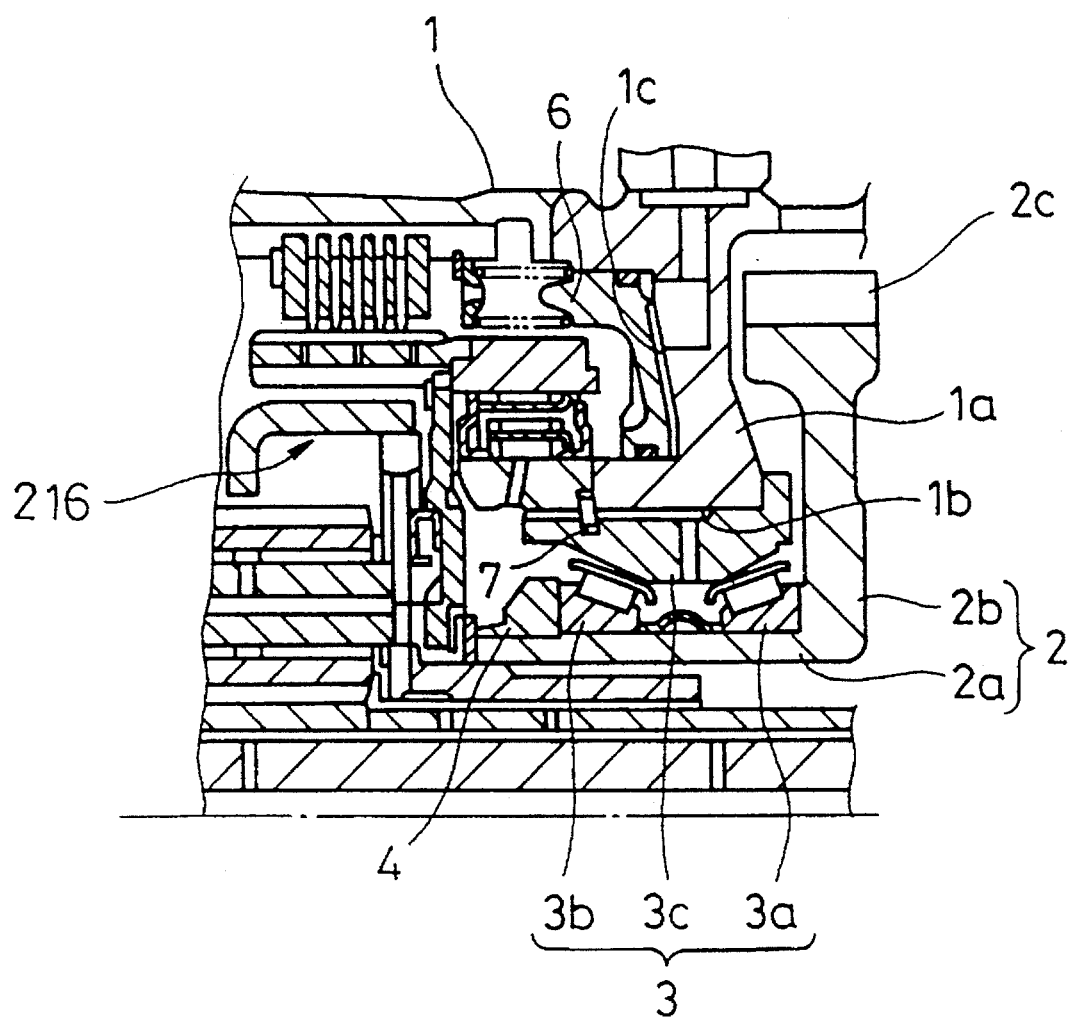
FIG. 2 is a fragmentary sectional view showing a half of a conventional structure for mounting an output gear and a bearing to a hydraulic automatic transmission.

As previously mentioned, an output gear-and-bearing mounting structure applied to this type of automatic transmission is disclosed in Unexamined Japanese Patent Publication (KOKAI) No. 1-98736. In the transmission equipped with this mounting structure, as shown in FIG. 2 (which corresponds to part A in FIG. 4 of Unexamined Japanese Patent Publication No. 1-98736), the output gear 2 has a boss 2a which is inserted, together with a double row tapered roller bearing (hereinafter merely referred to as "bearing") 3, into an axial hole 1b formed through the partition wall 1a of the transmission casing 1. In other words, the output gear 2 is rotatably supported by the partition wall 1a through the bearing 3. This bearing 3 corresponds to the bearing 8 shown in FIG. 1.

The output gear 2 is coupled at the boss 2a to an output rotating element 216 (corresponding to the element 116 in FIG. 1) of the planetary gear unit by means of, e.g., spline-fitting. The output gear 2 also has a flange 2b integral with the boss 2a, and a gear 2c is formed on the outer peripheral surface of the flange 2b and meshed with the transfer gear 50 (FIG. 1). Accordingly, large torque is transmitted from the planetary gear unit 30 (FIG. 1) to the transfer gear 50 via the output gear 2.

The bearing 3 supporting the output gear 2 has inner races 3a and 3b, an outer race 3c, and rolling members interposed between the inner and outer races. The inner races 3a and 3b are fitted around the boss 2a of the output gear 2, and then securely fixed to the boss 2a by tightening a locking nut 4 engaged with a thread cut in the outer peripheral surface of the boss 2a. The outer race 3c of the bearing 3 is spline-fitted into the axial hole 1b of the partition wall 1a, and then securely fixed to the partition wall 1a by fitting a snap ring 7 around the outer race 3c. In this manner, the inner races 3a, 3b and outer race 3c of the bearing 3 are secured to the output gear 2 and the partition wall 1a, respectively, thereby mounting the output gear 2 to the partition wall 1a through the bearing 3.

In the transmission, however, large torque is transmitted through the output gear 2, as mentioned above. Therefore, the structure shown in FIG. 2 wherein the outer race 3c of the bearing 3 supporting the output gear 2 is fixed to the partition wall 1a by means of the snap ring 7 and the spline coupling between the elements 1a and 3c is disadvantageous in that it is poor in strength.

Figure 3:
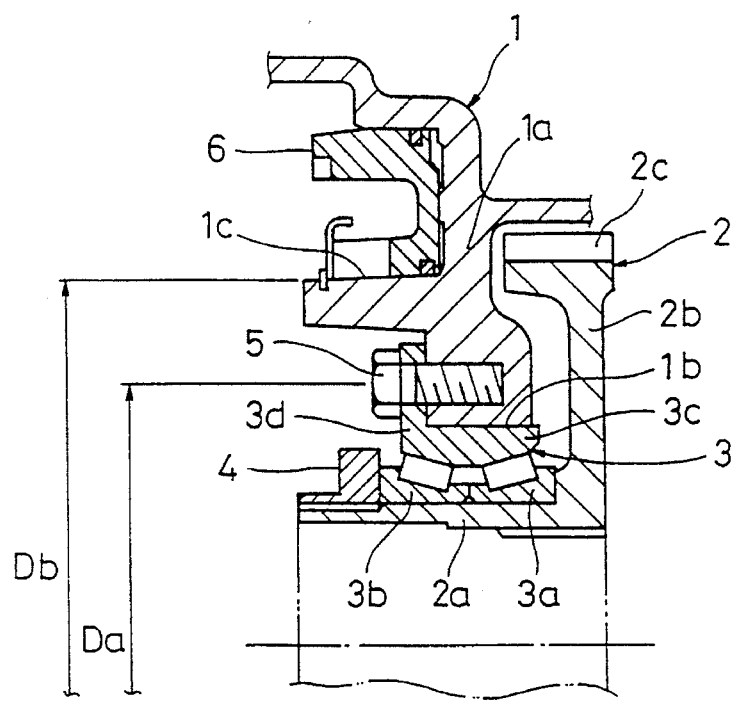
FIG. 3 is a fragmentary sectional view showing a half of another output gear-and-bearing mounting structure for a hydraulic automatic transmission.

The problem of strength may be eliminated by bolting the outer race 3c of the bearing 3 to the partition wall 1a, instead of using the spline coupling and the snap ring. However, since the flange 2b of the output gear 2 is located on one side of the bearing 3 and the partition wall 1a, bolts 5 must be situated on the other side of the partition wall 1a opposite to the flange 2b, as shown in FIG. 3, to securely fix the outer race 3c of the bearing 3 to the partition wall 1a. In this case, a flange 3d extending integrally from the outer race 3c of the bearing 3 must be formed so as to allow the bolts 5 to be passed therethrough. This, however, results in an increased diameter of the bearing 3, making it difficult to provide a compact transmission.

Further, in the type of hydraulic automatic transmission shown in FIG. 1, the planetary gear unit 30 is arranged in the casing 1 on the same side of the partition wall 1a as the heads of the bolts 5, and a portion of the partition wall 1a located more outward than the bearing 3 in the diametrical direction of the transmission constitutes a cylinder 1c of an actuator associated with a hydraulic frictional engaging element, for example, the hydraulic brake B1, in order to make the transmission compact. Reference numeral 6 denotes a piston forming the actuator in cooperation with the cylinder 1c.

Thus, in the case where the cylinder 1c is formed by the diametrically outward portion of the partition wall 1a, the inner diameter Db of the cylinder 1c must be made considerably greater than the diameter Da of a circle along which the bolts 5 are arranged, to permit the bearing 3 to be bolted to the partition wall 1a. This inevitably entails an increase in the outer diameter of the cylinder 1c and thus in the diameter of the transmission casing 1, posing a problem in that the transmission is increased in size.

Furthermore, in the output gear-and-bearing mounting structure shown in FIG. 3, the output gear 2 and the bearing 3 cannot be joined together (assembled) in advance. Namely, the structure of FIG. 3 requires the following procedure for the assembling. First, the outer race 3c of the bearing 3 is bolted to the partition wall 1a, then with the rolling members and inner races 3a and 3b of the bearing 3 fitted inside the outer race 3c, the boss 2a of the output gear 2 is inserted through the inner races 3a and 3b, and finally the inner races 3a and 3b are tightened and fixed to the output gear 2 by the locking nut 4 threadedly fitted around the portion of the boss 2a opposite to the flange 2b. Further, in order to make the transmission compact, the space between the locking nut 4 for fixing the inner races 3a and 3b and the bolts 5 for fixing the outer race 3c must be reduced, providing only a small space for the insertion of a locking nut-tightening tool. Thus, the efficiency in assembling the output gear 2, the bearing 3 and peripheral parts thereof lowers.

A hydraulic automatic transmission for a motor vehicle which is equipped with an output gear-and-bearing mounting structure according to one embodiment of the present invention will be now described.

Figure 4:
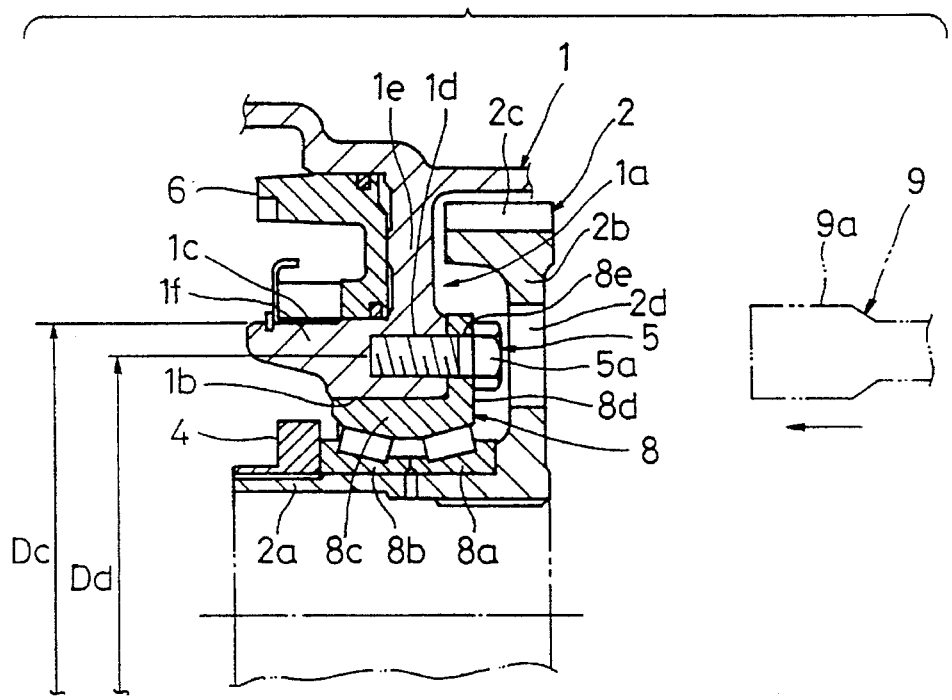
FIG. 4 is a fragmentary sectional view showing a half of an output gear-and-bearing mounting structure for a hydraulic automatic transmission according to an embodiment of the present invention.

This transmission has a basic arrangement identical to that of the transmission shown in FIG. 1, and is characterized by an output gear-and-bearing mounting structure shown in FIG. 4 by which the aforementioned problem associated with the prior art is eliminated.

Referring to FIG. 1, the basic arrangement of the transmission will be described in further detail. The transmission has an input shaft 111 coupled to a turbine 21 of the torque converter 20 for rotation together therewith, and planetary gears 112 and 113 supported by the input shaft 111 and forming the planetary gear unit 30. Reference numeral 22 represents a damper clutch for direct coupling.

Input sides of the clutches C1, C2 and C3 are operatively coupled to the input shaft 111, and output sides of the clutches C1, C2 and C3 are coupled, respectively, to a sun gear 114 of the planetary gear 112, a pinion carrier 117 and a sun gear 118 of the planetary gear 113. Each clutch has input and output sides thereof engaged or disengaged as operating oil is supplied thereto or discharged therefrom.

The transmission casing 1 is provided with the brakes B1 and B2. The brake B1 engages when supplied with operating oil, to hold an internal gear 115 of the planetary gear 112 stationary and prevent the gear 115 from rotating, and disengages when the operating oil is discharged therefrom, thus permitting rotation of the internal gear 115. Similarly, the brake B2 holds the sun gear 118 of the planetary gear 113 stationary when supplied with operating oil, and permits rotation of the sun gear 118 when the operating oil is discharged therefrom.

In this transmission, supply/discharge of the operating oil to/from the frictional engaging elements, i.e., the clutches C1, C2 and C3 and the brakes B1 and B2, is controlled so as to establish a desired speed from among first to fourth forward speeds and one reverse speed, though detailed description is omitted.

Rotation of the input shaft 111 is transmitted to the differential 40 through the planetary gear unit 30, the output gear 2 coupled to the planetary carrier 116 of the planetary gear 112 in the unit 30, and a countershaft 119 rotated together with the transfer gear 50 meshed with the output gear 2.

Referring now to FIG. 4, the output gear-and-bearing mounting structure according to this embodiment will be described. FIG. 4 shows the part A in FIG. 1 in section, and in this figure, like reference numerals are used to denote identical or similar members appearing in FIGS. 2 and 3.

As shown in FIG. 4, the partition wall 1a integral with the transmission casing 1 has an annular, base-side half 1e extending inward from the casing 1 in a direction perpendicular to the longitudinal axis of the transmission, and a cylindrical, distal end-side half 1f extending from the half 1e along the axis of the transmission. The planetary gear unit 30 (FIG. 1) is arranged on the left-hand side of the partition wall 1a in the axial direction of the transmission, as viewed in FIG. 4.

The partition wall 1a forms the cylinder 1c in cooperation with the casing 1. Specifically, the cylinder 1c is defined by the left-hand side surface of the base-side half 1e of the partition wall, the outer peripheral surface of the distal end-side half 1f, and the inner peripheral surface of the casing 1. The piston 6 is slidably received in the cylinder 1c, and the cylinder 1c and the piston 6 constitute an actuator for supplying and discharging operating oil to and from the brake B1 of the transmission.

Also, the partition wall 1a rotatably supports the output gear 2 of the transmission, and an axial hole 1b extending along the axis of the transmission is formed through the distal end-side half 1f. The input shaft 111 (FIG. 1) of the transmission is inserted through the axial hole 1b. A double row tapered roller bearing 8 composed of inner races 8a and 8b and an outer race 8c is fitted into the axial hole 1b, and the outer race 8c of the bearing 8 is fixed to an annular, right-hand side surface of the distal end-side half 1f of the partition wall 1a by the bolts 5.

To permit the outer race 8c to be bolted to the partition wall 1a, a plurality of, e.g., four, threaded holes 1d are formed in the right-hand side surface of the partition wall 1a at regular intervals around the circumference of the axial hole 1b, and each threaded hole 1d extends along the axis (input shaft 111) of the transmission. Four through holes 8e are formed through a flange 8d of the outer race 8c which extends along the right-hand side surface of the partition wall 1a, such that the holes 8e correspond in position to the respective threaded holes 1d. Each through hole 8e has a diameter slightly greater than that of the shank of the bolt 5.

Further, four through holes 2d are formed through the flange 2b of the output gear 2 which extends along the flange 8d of the bearing, so as to be aligned with the respective threaded holes 1d of the partition wall 1a. The diameter of each through hole 2d is greater than that of the head 5a of the bolt 5 and also greater than that of a head portion 9a of a bolt-tightening tool 9, indicated by two-dot-chain line in FIG. 4. The tool head 9a can be fitted on the bolt head 5a, and thus the tool 9 can be inserted through the through hole 2d with a small space therebetween.

In the output gear-and-bearing mounting structure (FIG. 4) according to this embodiment, the bearing 8 is bolted to the partition wall 1a from one side thereof opposite to the planetary gear unit 30 (FIG. 1) and the actuator (1c, 6), unlike the mounting structure shown in FIG. 3. Accordingly, the bolt heads 5a are located on the side of the partition wall 1a opposite to the actuator cylinder 1c in the axial direction of the transmission. Although, also in this embodiment, the cylinder 1c is arranged more outward in the diametrical direction of the transmission than the threaded holes 1d into which the bolts 5 are screwed, the mechanical strength requirement for the bolts 5 and related parts can be met by making the inner diameter Dc of the cylinder 1c only slightly greater than the diameter Dd of a circle along which the threaded holes 1d are arranged. For example, the inner diameter Dc of the cylinder is set to a value equal to the sum of the diameter Dd and the diameter of the threaded hole 1d. Consequently, the outer diameter of the cylinder 1c can be greatly reduced, as compared with the structure (FIG. 3), and thus the diameter of the casing 1 can be correspondingly reduced.

In other respects, the mounting structure of this embodiment has an arrangement substantially identical to that shown in FIG. 3; therefore, detailed description is omitted.

The following explains how the output gear 2 and peripheral parts thereof are mounted to the transmission.

First, the output gear 2 and the bearing 8 are assembled in advance, by fitting the bearing 8 onto the boss 2a of the output gear 2, fitting the locking nut 4 around the thread cut in the outer peripheral surface of the boss 2a close to the planetary gear unit and tightening the nut 4, thereby mounting the bearing 8 to the output gear 2. In this case, since the flange 8d of the outer race 8c of the bearing 8 and the locking nut 4 are located on opposite sides, a tool (not shown) for tightening the locking nut 4 does not interfere with the bearing 8 when the nut 4 is tightened, thus facilitating the assembling work.

Subsequently, the assembly composed of the output gear 2 and the bearing 8 is inserted into the axial hole 1b of the partition wall 1a from the right-hand side in FIG. 4, and the circumferential position of the assembly with respect to the axial hole 1b is adjusted as needed such that the through holes 8e of the flange 8d are aligned with the respective threaded holes 1d of the partition wall 1a. Then, the bolts 5 are fitted into the respective threaded holes 1d of the partition wall 1a through the through holes 2d of the flange 2b of the output gear 2.

Further, the head portion 9a of the bolt-tightening tool 9 is fitted onto the head 5a of each bolt 5, and the bolt 5 is firmly screwed into the threaded hole 1d with the tool 9. Since the tool head 9a can be inserted through each through hole 2d of the output gear 2, the bolts 5 can be screwed with the tool 9 until the bolt heads 5a are pressed against the flange 2b of the bearing 2b, whereby the bearing 8 is securely fixed to the partition wall 1a by the bolts 5. Thus, the output gear 2 is rotatably supported by the partition wall 1a via the bearing 8.

The present invention is not limited to the above-described embodiment, and various modifications can be made.

For example, although the foregoing embodiment is applied to four forward speed-type hydraulic automatic transmission, the present invention is applicable to other various types of transmissions.

Further, in the above embodiment, through holes 2d corresponding in number to the threaded holes 1d of the partition wall 1a, that is, four through holes 2d, are formed in the flange 2b of the output gear 2, in consideration of the balance of weight of the output gear 2 and the assembling efficiency. However, one or more through holes, e.g., a single through hole 2d, suffice. In this case, when fixing the output gear 2 and the bearing 8 to the partition wall 1a by the bolts 5, the four bolts 5 are fitted and screwed, one by one, into the respective four threaded holes 1d of the partition wall 1a through the single through hole 2d with the output gear 2 turned appropriately.

Furthermore, the procedure for mounting the output gear 2 and the bearing 8 to the partition wall 1a is not limited to that described in the foregoing embodiment. For example, the locking nut 4 may be fitted onto the boss 2a of the output gear 2 and tightened in the last stage of assembling. Also in this case, since large space is defined between the locking nut 4 and the cylinder 1c of the partition wall 1a, sufficient space is ensured for the insertion of the locking nut-tightening tool (not shown), thus facilitating the manipulation of the tool and improving the assembling efficiency.

What is claimed is:

1. In a mounting structure for mounting an output gear and a bearing to a transmission including a casing containing a planetary gear unit having a plurality of rotating elements and coupled to an input shaft, the output gear being rotatably supported by the bearing fitted in an axial hole which is formed in a partition wall extending inward from the casing and which extends along a longitudinal axis of the transmission, the improvement comprising:

said partition wall having a side surface in which a threaded hole extending along the longitudinal axis of the transmission is formed;

said bearing having a hole formed therein in alignment with the threaded hole;

said output gear having a boss fitted into the bearing and coupled to a corresponding one of the rotating elements of the planetary gear unit, and a flange extending from the boss along the side surface of the partition wall, the flange having a through hole formed therein for alignment with the threaded hole of the partition wall and the hole of the bearing; and said mounting structure including a bolt for fixing the bearing to the side surface of the partition wall, the bolt adapted to be inserted through the through hole of the flange and the hole of the bearing and screwed into the threaded hole of the partition wall.

2. The mounting structure according to claim 1, wherein said transmission includes a hydraulic friction element which engages or disengages in response to supply or discharge of operating oil by means of an actuator, and wherein a second side surface of the partition wall opposite to said side surface defines at least part of a cylinder of the actuator, the cylinder being located on an outer side of the bearing with respect to the bolt in a diametrical direction of the transmission.

3. The mounting structure according to claim 1, wherein said bolt has a head adapted to receive a head portion of a bolt-tightening tool, and the through hole of the flange has a diameter adapted to allow the head portion of the bolt-tightening tool to pass therethrough.

* * * * *